United States Patent
Khalid et al.

(10) Patent No.: US 9,680,724 B2
(45) Date of Patent: *Jun. 13, 2017

(54) NETWORK COMMUNICATION AND COST AWARENESS

(71) Applicant: Microsoft Technology Licensing, LLC, Redmond, WA (US)

(72) Inventors: Suhail Khalid, Issaquah, WA (US);
Alexander Corradini, Ebikon (CH);
Michael A. Ziller, Renton, WA (US);
Ravi T. Rao, Redmond, WA (US);
David G. Thaler, Redmond, WA (US);
Andrew J. Ritz, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/149,992

(22) Filed: May 9, 2016

(65) Prior Publication Data

US 2016/0254977 A1 Sep. 1, 2016

Related U.S. Application Data

(63) Continuation of application No. 13/229,499, filed on Sep. 9, 2011, now Pat. No. 9,344,335.

(51) Int. Cl.
*G06F 15/16* (2006.01)
*H04L 12/26* (2006.01)
(Continued)

(52) U.S. Cl.
CPC ......... *H04L 43/0876* (2013.01); *G06Q 10/06* (2013.01); *H04L 12/1421* (2013.01);
(Continued)

(58) Field of Classification Search
CPC . H04L 43/0876; H04L 41/0896; H04L 43/16; H04L 63/20; H04L 67/02; H04L 67/34
See application file for complete search history.

(56) References Cited

U.S. PATENT DOCUMENTS 5,485,455 A   1/1996  Dobbins et al.
5,491,694 A   2/1996  Oliver et al.
(Continued)

FOREIGN PATENT DOCUMENTS

CN   101631124 A   1/2010
EP      1338968 A2   8/2003
(Continued)

OTHER PUBLICATIONS

"Supplementary Search Report Issued in European Patent Application No. 11872093.7", Mailed Date: Mar. 19, 2015, 7 Pages.
(Continued)

*Primary Examiner* — Moustafa M Meky
(74) *Attorney, Agent, or Firm* — Davin Chin; Chin IP, PLLC

(57) ABSTRACT

Network communication and cost awareness techniques are described. In one or more implementations, functionality is exposed through one or more application programming interfaces (APIs) that is accessible to a plurality of applications of the computing device to perform network communication. Data is returned to one or more of the plurality of applications regarding a cost network used to perform the network communication.

20 Claims, 6 Drawing Sheets

(51) Int. Cl.
| | |
|---|---|
| *H04L 12/24* | (2006.01) |
| *H04L 12/14* | (2006.01) |
| *H04L 29/08* | (2006.01) |
| *H04N 21/237* | (2011.01) |
| *H04N 21/238* | (2011.01) |
| *H04N 21/2743* | (2011.01) |
| *H04N 21/442* | (2011.01) |
| *H04N 21/61* | (2011.01) |
| *G06Q 10/06* | (2012.01) |
| *H04L 29/06* | (2006.01) |

(52) U.S. Cl.
CPC ...... *H04L 41/0893* (2013.01); *H04L 41/0896* (2013.01); *H04L 43/16* (2013.01); *H04L 63/20* (2013.01); *H04L 67/02* (2013.01); *H04L 67/34* (2013.01); *H04N 21/237* (2013.01); *H04N 21/23805* (2013.01); *H04N 21/2743* (2013.01); *H04N 21/44204* (2013.01); *H04N 21/44209* (2013.01); *H04N 21/6181* (2013.01); *H04L 69/321* (2013.01)

(56) References Cited

U.S. PATENT DOCUMENTS

| | | | |
|---|---|---|---|
| 5,521,910 | A | 5/1996 | Matthews |
| 5,790,546 | A | 8/1998 | Dobbins et al. |
| 6,101,170 | A | 8/2000 | Doherty et al. |
| 6,650,639 | B2 | 11/2003 | Doherty et al. |
| 7,075,536 | B1 | 7/2006 | Goldschmidt |
| 7,747,785 | B2 | 6/2010 | Baker, III et al. |
| 8,325,627 | B2 | 12/2012 | Pratt et al. |
| 8,347,386 | B2 | 1/2013 | Mahaffey et al. |
| 8,406,248 | B2 | 3/2013 | Pratt et al. |
| 8,478,233 | B2 | 7/2013 | Liu et al. |
| 8,504,781 | B2* | 8/2013 | Ido ..................... G06F 9/544 711/118 |
| 2002/0107877 | A1 | 8/2002 | Whiting et al. |
| 2003/0061179 | A1 | 3/2003 | Reece |
| 2004/0111725 | A1 | 6/2004 | Srinivasan et al. |
| 2006/0015636 | A1 | 1/2006 | Skraba et al. |
| 2006/0112427 | A1 | 5/2006 | Shahbazi |
| 2007/0033530 | A1 | 2/2007 | Motoyama et al. |
| 2008/0046377 | A1 | 2/2008 | Major et al. |
| 2008/0049714 | A1 | 2/2008 | Commarford et al. |
| 2008/0065835 | A1* | 3/2008 | Iacobovici .......... G06F 12/0817 711/141 |
| 2008/0167033 | A1 | 7/2008 | Beckers |
| 2008/0200154 | A1 | 8/2008 | Maharajh et al. |
| 2008/0250024 | A1 | 10/2008 | Kvm et al. |
| 2010/0011090 | A1 | 1/2010 | Gordon |
| 2010/0030785 | A1 | 2/2010 | Wilson et al. |
| 2010/0151851 | A1 | 6/2010 | Bhatia et al. |
| 2011/0047594 | A1 | 2/2011 | Mahaffey et al. |
| 2011/0047597 | A1 | 2/2011 | Mahaffey et al. |
| 2011/0047620 | A1 | 2/2011 | Mahaffey et al. |
| 2011/0131321 | A1 | 6/2011 | Black et al. |
| 2011/0145920 | A1 | 6/2011 | Mahaffey et al. |
| 2012/0047201 | A1 | 2/2012 | Jain |
| 2012/0108206 | A1 | 5/2012 | Haggerty |
| 2012/0110174 | A1 | 5/2012 | Wootton et al. |
| 2012/0174212 | A1 | 7/2012 | Dart et al. |
| 2012/0240236 | A1 | 9/2012 | Wyatt et al. |
| 2012/0290640 | A1 | 11/2012 | Mahaffey et al. |
| 2012/0326883 | A1 | 12/2012 | Angelis et al. |
| 2013/0035059 | A1 | 2/2013 | Liu et al. |
| 2013/0097416 | A1 | 4/2013 | Barra et al. |
| 2014/0024339 | A1 | 1/2014 | Dabbiere et al. |
| 2014/0071290 | A1 | 3/2014 | Collen et al. |
| 2014/0101103 | A1 | 4/2014 | Chan et al. |
| 2014/0359056 | A1 | 12/2014 | Mani et al. |
| 2015/0358406 | A1 | 12/2015 | Scheer et al. |

FOREIGN PATENT DOCUMENTS

| | | |
|---|---|---|
| JP | 2007065944 A | 3/2007 |
| JP | 2009135728 A | 6/2009 |
| KR | 1020050061902 A | 6/2005 |
| WO | 2010128391 A2 | 11/2010 |
| WO | 2011014558 A2 | 2/2011 |

OTHER PUBLICATIONS

"First Office Action and Search Report Issued in Chinese Patent Application No. 201210331105.6", Mailed Date: Sep. 2, 2014, 10 Pages.

"Office Action Issued in Chinese Patent Application No. 201210331105.6", Mailed Date: May 9, 2016, 06 Pages.

"Office Action Issued in Chinese Patent Application No. 201210331105.6", Mailed Date: Sep. 6, 2015, 8 Pages.

"Second Office Action Issued in Chinese Patent Application No. 201210331105.6", Mailed Date: Feb. 28, 2015, 8 Pages.

"Final Office Action Received in Japan Application No. 2014-529681", Mailed Date: Mar. 8, 2016, 4 Pages.

"Office Action Issued in Japanese Patent Application No. 2014-529681", Mailed Date: Aug. 4, 2015, 6 Pages.

"Examiner's Answer to Appeal Brief", U.S. Appl. No. 13/229,499, Oct. 22, 2014, 5 pages.

"Extended European Search Report", EP Application No. 11872093.7, Mar. 19, 2015, 7 pages.

"Final Office Action Received in Japan Application No. 2014-529681", Mailed Date: Mar. 8, 2016, 4 Pages including English Translation.

"Final Office Action Received in Japan Application No. 2014-529681", Mailed Date: Mar. 8, 2016, 2 Pages. (W/o English Translation).

"Final Office Action", U.S. Appl. No. 13/229,499, Jan. 31, 2014, 7 pages.

"First Office Action and Search Report Issued in Chinese Patent Application No. 201210331105.6", Mailed Date: Sep. 2, 2014, 13 Pages.

"Foreign Office Action", CN Application No. 201210331105.6, Feb. 28, 2015, 9 pages.

"International Search Report & Written Opinion for PCT Application No. PCT/US2013/058668". Mailed Date: Mar. 12. 2014, Filed Date: Sep. 9, 2013, 9 Pages.

"International Search Report", Mailed Date: Sep. 20, 2012, Application No. PCT/US2011/055694, Filed Date: Oct. 11, 2011, pp. 9.

"Managing Network Usage", Retrieved from <http://developer.android.com/training/basics/network-ops/managing.html> on Mar. 4, 2013, (Feb. 3, 2013), 7 pages.

"Non-Final Office Action", U.S. Appl. No. 13/229,499, (Mar. 25, 2013), 4 pages.

"Non-Final Office Action", U.S. Appl. No. 13/229,499, (Oct. 11, 2013), 7 pages.

"Quickstart: Managing Metered Network Cost Constraints (Windows)", Retrieved from <http://msdn.microsoft.com/enn/library/windows/apps/hh750310.aspx> on Mar. 4, 2013, (Nov. 29, 2012), 7 pages.

"Reexamination Decision", CN Application No. 201210331105.6, Mar. 29, 2016, 2 pages.

"Remote Backup in the Cloud", White Paper of CDW, Available at <http://www.edtechmagazine.com/higher/sites/edtechmagazine.com.higher/files/remote-backup-in-the-cloud.pdf> ,(2012), 8 pages.

"Restriction Requirement", U.S. Appl. No. 13/229,499, (Feb. 7, 2013), 5 pages.

Chao Li, "Method and device for downloading data", Jan. 20, 2010, ProQuest translation of CN101631124 obtained Apr. 6, 2015, 22 pages.

Lu, et al., "Requester-Aware Power Reduction", Retrieved at <<http://www.google.co.in/url?sa=t&source=web&cd=4&sqi=2&ved=0CDIQFjAD&url=http%3A%2F%2Fciteseerx.ist.psu.edu%2Fviewdoc%2Fdownload%3Fdoi%3D10.1.1.16.8421%26rep%3Drep1%26type%3Dpdf&rct=j&q=API%20for%20%22power-friendly%22%20downloads%20and&ei=BcIdTrTTDsrmrAeQ>>, Proceedings of The 13th International Symposium on System Synthesis, 2000, pp. 18-23.

(56) References Cited

OTHER PUBLICATIONS

Non-Final Office Action dated Aug. 17, 2015 in U.S. Appl. No. 13/905,091, 21 pages.
Tu, Hoang "[Windows 8] How to Decrease Data or Bandwidth Usage (By Using 'Metered Connection'), and How to Turn on 'Airplane Mode'", Retrieved from <http://dottech.org/88703/windows-8-how-to-minimize-data-or-bandwidth-usage-byusing-metered-connection-and-how-to-turn-on-airplane-mode/> on Mar. 4, 2013, (Nov. 28, 2012), 7 pages.
Verboon, Alex "Windows 8—Metered Connections", Retrieved from <http://www.verboon.info/index.php/2012/10/windows-8metered-connections/> on Mar. 4, 2013, (Oct. 17, 2012), 8 pages.
"Notice of Allowance Issued in Chinese Patent Application No. 201210331105.6", Mailed Date: Aug. 8, 2016, 4 Pages.
"Response Filed in European Patent Application No. 11872093.7", Filed Date: Oct. 13, 2015, 10 Pages.
"Ammendment Filed in U.S. Appl. No. 13/229,499", filed Dec. 3, 2015, 8 Pages.
"Appeal Brief Issued in U.S. Appl. No. 13/229,499", filed Sep. 2, 2014, 27 Pages.
"Dismissal of Appeal Issued in U.S. Appl. No. 13/229,499", Mailed Date: Dec. 9, 2015, 2 Pages.
"Notice of Allowance and Examiner Initiated Interview Summary Issued in U.S. Appl. No. 13/229,499", Mailed Date: Jan. 14, 2016, 9 Pages.
"Notice of Appeal Filed in U.S. Appl. No. 13/229,499", filed Apr. 30, 2014, 2 Pages.
"Notice of Panel Decision Issued in U.S. Appl. No. 13/229,499", Mailed Date: Jul. 1, 2014, 7 Pages.
"Response Filed in U.S. Appl. No. 13/229,499", filed Mar. 8, 2013, 7 Pages.
"Response Filed in U.S. Appl. No. 13/229,499", filed Jun. 26, 2013, 13 Pages.
"Response Filed in U.S. Appl. No. 13/229,499", filed Jan. 10, 2014, 14 Pages.
"Final Office Action Issued in U.S. Appl. No. 13/905,091", Mailed Date: Oct. 20, 2016, 25 Pages.
"Response Filed in Chinese Patent Application No. 201210331105.6", Filed Date: Dec. 4, 2015, 6 Pages.
"Response Filed in Chinese Patent Application No. 201210331105.6", Filed Date: Nov. 13, 2014, 7 Pages.
"Response Filed in Chinese Patent Application No. 201210331105.6", Filed Date: May 13, 2015, 3 Pages.
"Response Filed in Japanese Patent Application No. 2014-529681", Filed Date: Oct. 13, 2015, 8 Pages.
"International Preliminary Report on Patentability Issued in PCT Application No. PCT/US2011/055694", Mailed Date: Mar. 12, 2014, 5 Pages.
"International Preliminary Report on Patentability Issued in PCT Application No. PCT/US2013/058668", Mailed Date: Dec. 10, 2015, 7 Pages.
"Notice of Intends to Grant Issued in European Patent Application No. 11872093.7", Mailed Date: Sep. 1, 2016, 40 Pages.

\* cited by examiner

NETWORK COMMUNICATION AND COST AWARENESS

CROSS-REFERENCE TO RELATED APPLICATION(S)

This application is a continuation of U.S. patent application Ser. No. 13/229,499, filed Sep. 9, 2011, entitled "NETWORK COMMUNICATION AND COST AWARENESS". The entirety of this afore-mentioned application is incorporated herein by reference.

BACKGROUND

Users have access to an ever increasing variety of computing devices that may be configured for network usage. For example, users may interact with a desktop computer, a mobile phone, a tablet computer, and so on to interact via wired or wireless networks.

Conventional techniques that were employed to access these networks, however, were often inefficient and therefore could consume a significant amount of resources, including power, processing, and network resources. Consequently, these conventional techniques could limit functionality available to a user of the device.

SUMMARY

Network communication and cost awareness techniques are described. In one or more implementations, functionality is exposed through one or more application programming interfaces (APIs) that is accessible to a plurality of applications of the computing device to perform network communication. Data is returned to one or more of the plurality of applications regarding a cost network used to perform the network communication.

In one or more implementations, functionality is exposed through one or more application programming interfaces (APIs) of an operating system that are accessible to a plurality of applications of the computing device to perform network communication. The functionality to perform network communication is managed by the operating system using one or more policies.

In one or more implementations, one or more computer-readable storage media comprise instructions stored thereon that, responsive to execution by a computing device, causes the computing device to implement an operating system configured to expose functionality via one or more application programming interfaces (APIs) to a plurality of applications of the computing device to perform a download via a cost network while at least a portion of a respective application that requested communication is in a suspended state.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Conventional techniques that were utilized to perform downloads were often fractured and did not address considerations other than performing the download itself. Consequently, these convention techniques did not address considerations relating to use of cost networks, such as possible financial implications to a user of excessive downloads and "going over a cap." Further, these conventional techniques typically did not address power consumption considerations in performing the download.

Network communication and cost awareness techniques are described. In one or more implementations, functionality is exposed via application programming interfaces that may be used to manage usage of a cost network. For example, these APIs may be involved in network communication performed by applications of a computing device, such as to act as an intermediary to one or more network interface devices. As such, the functionality may aware of the network communication performed by the applications, including interaction with a cost network. The functionality may then be used to help manage usage of the cost network, such as to inform of an amount of usage, automatically cease downloads when "over a cap," and so on.

This functionality may also be employed for a variety of techniques that do not (but may) involve cost networks. For example, these techniques may manage network usage using policies that may relate to a variety of different considerations, such as power considerations, download rates, type of data involving in network communication, and so on. In another example, these techniques may be employed while at least a part of an application is in a suspended state, which may serve to further conserve resources of a computing device. A variety of other examples are also contemplated, further discussion of which may be found in relation to the following figures.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
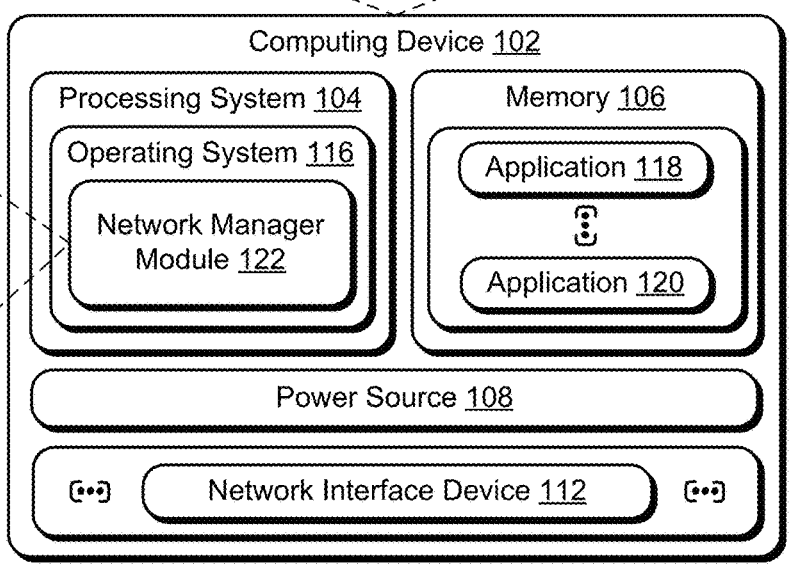
FIG. 1 is an illustration of an environment in an example implementation that is operable to employ a network manager module to manage network communication of one or more applications of a computing device.

FIG. 1 is an illustration of an environment 100 in an example implementation that is operable to employ network communication and cost awareness techniques. The illustrated environment 100 includes a computing device 102 that includes a processing system 104 (e.g., one or more processors, functional blocks), memory 106, a power source 108, a display device 110, and one or more network interface devices 112 configured to provide network connections via a network 114. In the following discussion represented entities may be indicative of one or more entities and thus reference may be made interchangeably to single or plural forms of the entities, e.g., network interface device 112, the network interface devices 112, and so on.

The computing device 102 may be configured in a variety of ways. For example, the computing device 102 may be configured as a computer that is capable of communicating over the network 114, such as a desktop computer, a mobile station, an entertainment appliance, a set-top box communicatively coupled to a display device, a wireless phone, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations (e.g., a server farm), a remote control and set-top box combination, an image capture device and a game console, and so on.

Although the network 114 is illustrated as the Internet, the network may assume a wide variety of configurations. For example, the network 114 may include a wide area network (WAN), a local area network (LAN), or an intranet and thus the network interface device 112 may be configured to access these networks via a wired connection. The network 114 may also be configured for access via wireless techniques, such as a wireless wide area network (WWAN), a wireless local area network (WLAN), a cellular network (e.g., a 3G, 4G, LTE network), and so on. The network interface device 112 may be representative of physical devices and also virtual network devices, such as those used to support a virtual private network, tunneling, and so on. Thus, although a single network 114 is shown, the network 114 may be representative of a plurality of networks.

The computing device 102 is further illustrated as including an operating system 116. The operating system 116 is configured to abstract underlying functionality of the computing device 102 to applications 118, 120 that are executable on the computing device 102. For example, the operating system 116 may abstract processing system 104, memory 106, power source 108 (e.g., battery or wired connection), and/or display device 110 functionality of the computing device 102 such that the applications 118, 120 may be written without knowing "how" this underlying functionality is implemented. The applications 118, 120, for instance, may provide data to the operating system 116 to be rendered and displayed by the display device 112 without understanding how this rendering may be performed.

Likewise, the operating system 116 may also abstract network connection functionality to the applications 118, 120 through use of a network manager module 122. The network manager module 122 is representative of functionality to manage usage of the network interface device 112 by the applications 118, 120 as well as operation of the network interface device 112, itself. For example, the network manager module 122 may manage communication of applications 118, 120 with one or more endpoints 124 via the network 114, such as a network service that may be used to manage a website, store data (e.g., images), communicate messages, and so on. Although the network manager module 122 and its corresponding cost awareness module 126 and integration module 128 are illustrated as part of the operating system 116, it should be readily apparent that this functionality may be implemented by a variety of different entities. Examples of such entities include standalone applications, third-party plugins, and so on.

The network manager module 122 may incorporate a variety of different functionality to perform this management. For example, the network manager module 122 may incorporate a cost awareness module 126 that is representative of functionality to manage interaction with a cost network. The network interface device 112, for instance, may be configured to interact with a cost network that allots different amounts of data communication for different fees, such as a flat rate for a capped amount with additional fees for overages, a tiered structure, and so on.

Accordingly, the cost awareness module 126 may employ techniques to manage interaction with these cost networks. The cost awareness module 126 may do so by exposing functionality via an application programming interface such that the applications 118, 120 may leverage these techniques without having to incorporate the functionality themselves. Further discussion of functionality of the cost awareness module 126 may be found in relation to FIG. 2.

The network manager module 122 is further illustrated as including an integration module 128. The integration module 128 is representative of functionality to integrate the functionality of the network manager module 122 with execution of the applications 118, 120. For example, the integration module 124 may support techniques to manage and maintain network connections with the endpoint 124. This may include pausing and resuming performance of a download, scheduling network communication, and so on. Further discussion of functionality of the integration module 126 may be found in relation to FIG. 3.

Thus, the network manager module 122 may be used to expose application programming interfaces to a plurality of applications 118, 120 to access functionality to perform network communication. Further, these application programming interfaces may be configured to communicate back to the applications 118, 120 as well as to the network interface device 112. Thus, a variety of different techniques may be implemented for management of network 114 access, such as cost awareness, resource usage (e.g., by a processing system 104, memory 106, power source 108, and display device 110), maintenance of network connections, and so on. A variety of other functionality is also contemplated. For example, the network manager module 122 may support a progressive download and playback, e.g., by hooking into a stream layer such that data may be composed as downloaded.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the network broker techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Figure 2:
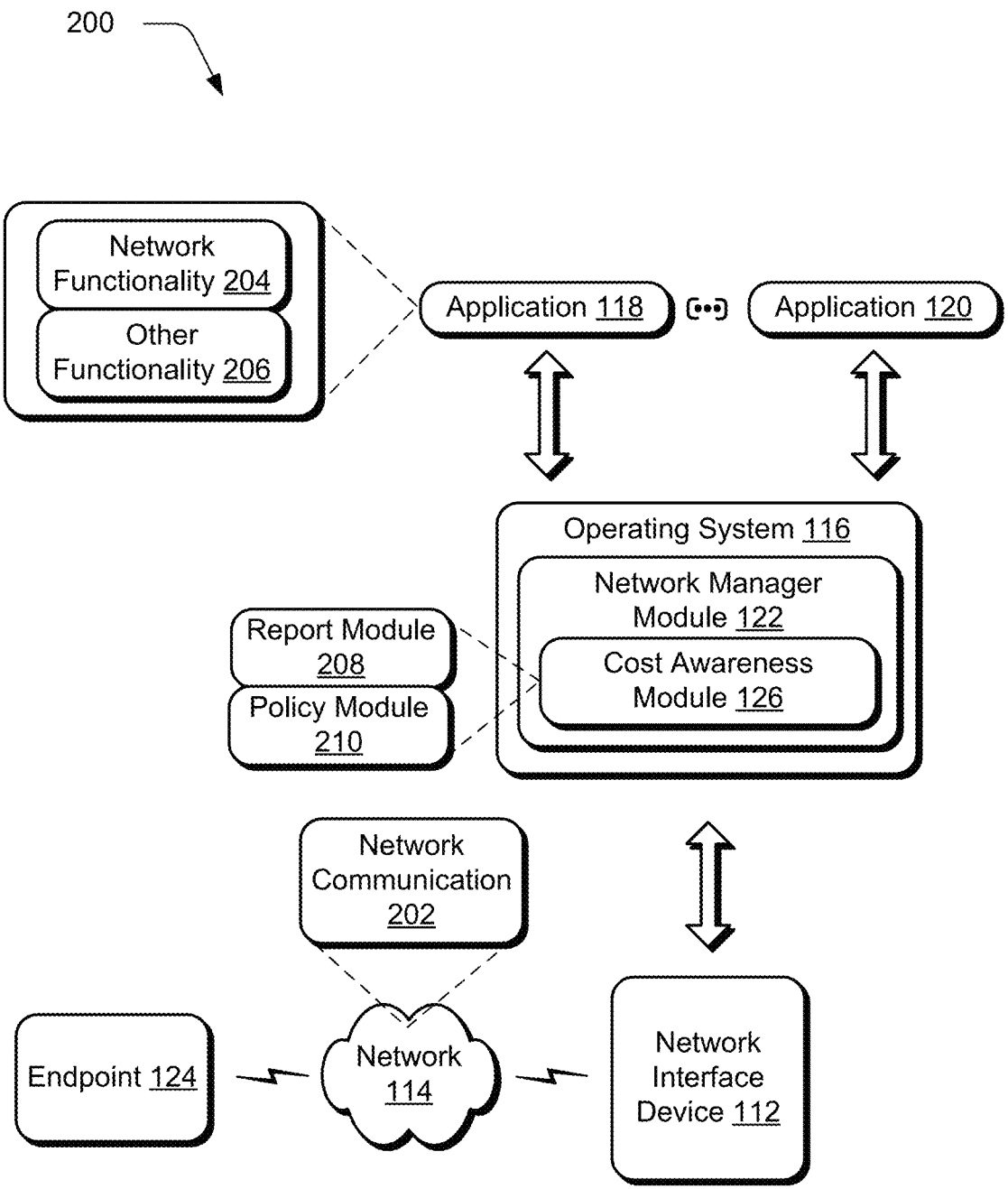
FIG. 2 is an illustration of a system in an example implementation showing example operation of a cost awareness module of a network manager module of FIG. 1.

FIG. 2 is an illustration of a system 200 in an example implementation showing example operation of a cost awareness module 126 of the network manager module 122 of FIG. 1. The system 200 as illustrated includes a network manager module 122 implemented as part of an operating system 116, although other implementations are also contemplated, e.g., a stand-alone download manager, and so on.

The network manager module 112 is illustrated as exposing functionality to a plurality of applications 118, 120, e.g., via one or more application programming interfaces. As previously described, this functionality may relate to network communication 202 over a network 114 using one or more network interface devices 112. For example, the network manager module 112 may be configured as a central point that manages interaction of the applications 118, 120 with network interface devices 112 configured to access wireless (e.g., Wi-Fi, Cellular) or wired networks. Thus, the network manager module 112 may have an "awareness" of the network communication 202 performed by the network interface device 112 for the applications 118, 120 and even services of the operating system 116, itself.

Therefore, the applications 118, 120 may "offload" management of network communication 202, which may be used to support a variety of features. In one or more implementations, privileges of the application that corresponds to the network communication 202 are maintained to perform the network communication, thereby protecting against elevation of privileges that may be exploited by malicious parties and reducing a chance of "leakage" across processes.

One such feature may permit network communication to be performed on behalf of the applications 118, 120 while the applications are in a suspended state. Thus, resource usage of the applications 118, 120 may be minimized. The applications 118, 120 may be placed in a suspended state due to a variety of different factors.

For example, the operating system 116 may be configured to place the applications 118, 120 in a suspended state when focus is moved to another application. The focus may be moved by minimizing a user interface of the application, movement of the user interface (e.g., window) from a foreground in a desktop user interface as shown in the display device 110 in FIG. 1 in which focus is given to an email application and not a browser or word processing application. The focus may also be moved through navigation away from the user interface of the application 118, 120 in an immersive environment, e.g., a user interface corresponding to the applications 118, 120 is "off screen." Thus, the operating system 116 may conserve resources of the computing device 102 by suspending execution of applications that are not available, directly, for user interaction.

The applications 118, 120 themselves may also be configured to increase efficiency of resource usage of the computing device 102. For example, application 118 may be vectored to form different parts that may be executed separately. An illustrated example of this for application 118 includes vectoring of network functionality 204 as separate from other functionality 206 of the application 118, such as functionality involved in the generation of a user interface for the application 118. Thus, the network functionality 204 may be keep active while the other functionality 206 (e.g., UI functionality) of the application 118 is suspended. Therefore, all or a part of the application 118 may be suspended during operation of the network manager module 122 to perform network communication 202 on behalf of the application 118. In other words, the execution of the network manager module 122 may be "sandboxed away" from execution of the applications 118, 102, e.g., through implementation on different processes.

The network manager module 122 may also support a variety of other functionality that may be exposed for usage by the applications 118, 120. Examples of such functionality are illustrated in FIG. 2 through a report module 208 and a policy module 210.

The report module 208 is representative of functionality of the network manager module 122 to "report back" to the applications 118, 120. For example, the report manager module 122 may provide information to an application 118 regarding network communication 202 that corresponds to the application 118. This may include a status of an upload or download performed for the application 118, amount of time used to perform the communication, whether the communication is completed, and so forth.

In another example, this report module 208 may provide information that relates to network usage by other applications. The report module 208, for instance, may report the status of a download or upload performed for application 118 to application 120. This information may also include data describing overall usage (e.g., usage by both applications 118, 120), such as amount of an allocation of a cost network that has been consumed by the applications 118, 120, whether a cost threshold has been reached, a current cost of network communication 202 (e.g., which may be indicated per application, indicate a particular network), amount of data uploaded or downloaded over particular connections, and so on. Thus, the report module 208 may keep the applications 118, 120 informed as to network communication 202 performed by the computing device 102.

The policy module 210 is representative of functionality of the network manager module 122 to employ one or more policies to manage network communication 202. The policy may involve a variety of different factors that may be used to manage network communication 202. In one such example, the policy may be configured to specify a rate of communication (e.g., download) to be employed for a particular application, over a particular network, at particular times, and so on. In another such example, the policy may be used to mark data to be communicated to change host or network behavior (e.g., in accordance with IPv6) regarding communication of the data. The policy module 210, for instance, may mark content as involving media which may be handled differently by the network 114 than other data, e.g., using prioritization.

In an additional example, a policy may specify how the network manager module 122 addresses power consumption considerations. The policy, for instance, may specify network communication 202 is performed at specified times, a network interface device 112 is woken at specified intervals from a suspended state to perform communications, use of coalesced communications from a plurality of applications, and so on. Additional discussion of scheduling, which may support power considerations, may be found in relation to FIG. 3.

In a further example, the policy may specify how data is to be obtained. The policy, for instance, may indicate that the data is to be downloaded via a Wi-Fi connection, if available, but not via a cost network such as a 3G, 4G, LTE cellular network. Thus, in such instances the policy may be configured so that the data may be downloaded for reduced cost and may even involve reduced consumption of resources, e.g., a lower powered radio of the network interface device 112.

In yet another example, a policy may specify how the network manager module 122 addresses a cost network. The policy, for instance, may specify that network communication 202 is prohibited when a cost threshold is reached, may cause output of a user interface that includes a prompt and an option that is selectable to "ok an overage," and so forth. A variety of other examples of policies and functionality that may be managed through use of policies may be found in relation to the following figure.

Figure 3:
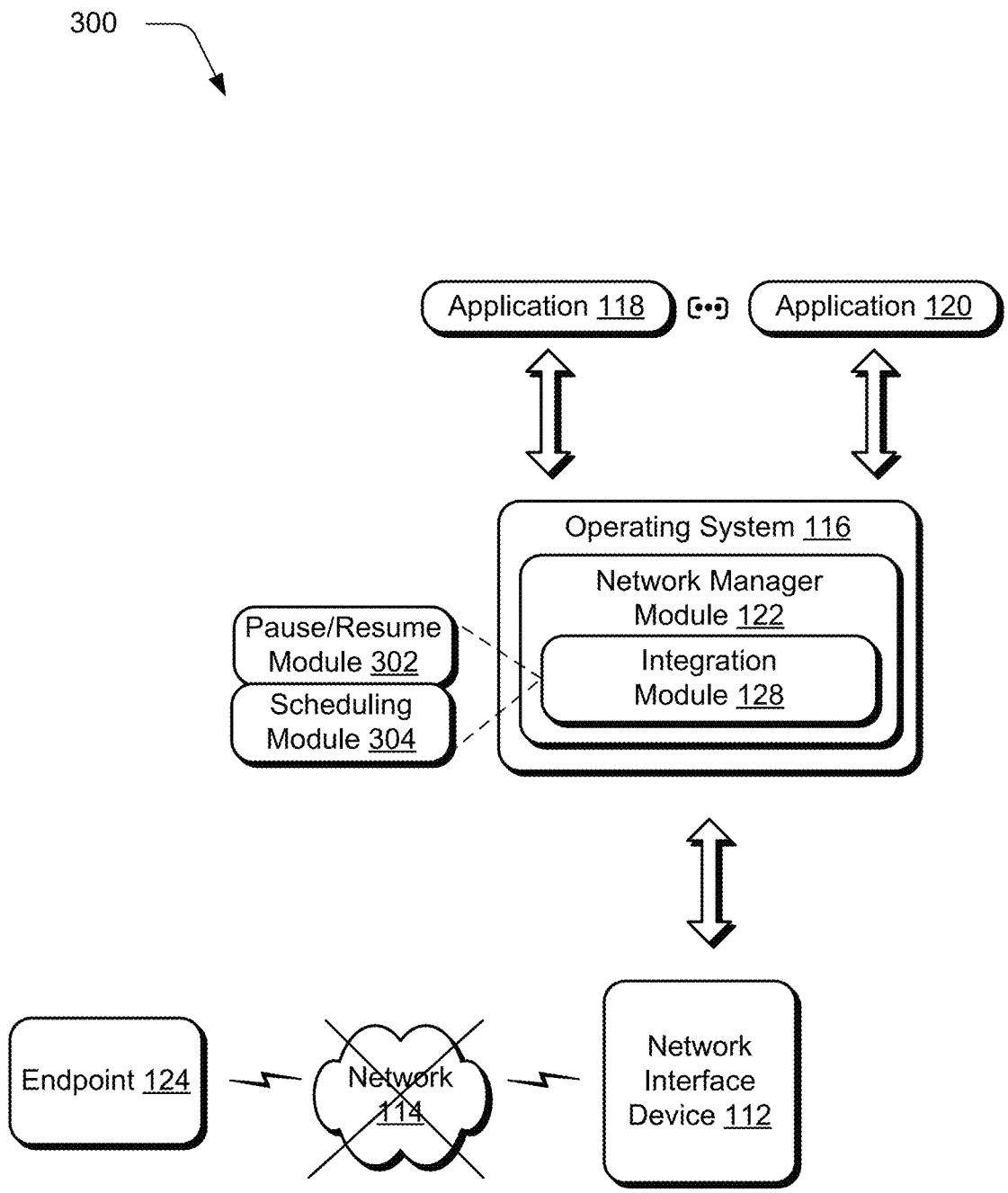
FIG. 3 is an illustration of a system in an example implementation showing example operation of an integration module of a network manager module of FIG. 1.

FIG. 3 is an illustration of a system 300 in an example implementation showing example operation of an integration module 124 of a network manager module 122 of FIG. 1. As before, the network manager module 122 may support a variety of functionality that may be exposed for usage by the applications 118, 120. Examples of such functionality are illustrated in FIG. 3 through a pause/resume module 302 and a schedule module 304.

The pause/resume module 302 is representative of functionality of the computing device 102 to pause and/or resume network communication. An application 118, for instance, may involve network communication with a "one time URL," such as to provide login credentials, interact with a secure site, and so on. Accordingly, the pause-resume module 302 may be configured to persist state between the application 118 and the endpoint 124, even when confronted with a network 114 outage.

The pause/resume module 302, for instance, may persist data available before a start of a network communication, which may include request headers provided by the application, cookies, a request entity body (e.g., for POST/PUT requests), a method name (e.g., for HTTP requests such as GET, POST), a destination path (e.g., a final location of downloaded file), a temporary path (e.g., location of the partially downloaded file).

Data may also be persisted that is received after a response from the endpoint 124, such as response headers, information whether communication is configured to be resumed or not, and so on. Other data that may be persisted may include data that may change during a network communication may include state of communication (e.g., "uploading," "downloading," "paused"), a current work item identifier, and so on.

Thus, if the endpoint 124 becomes unavailable during a network communication, the pause/resume module 302 may be used to "continue where it left off" so that data does not need to be communicated again, even in an instance of a "one time URL." Naturally other examples are also contemplated without departing from the spirit and scope thereof and it should be readily apparent that these techniques are equally applicable for network availability, computing device 102 initiated pause event (e.g., due to a policy), and so on.

The scheduling module 304 is representative of functionality of the computing device 102 to integrate with the applications 118, 120 to schedule network communication. This scheduling may be performed by leveraging policies as previously described to address a variety of situations.

The scheduling module 304, for instance, may be used to coalesce communications to be performed for the applications 118, 120. The scheduling module 304 may then cause the network interface device 112 to wake at intervals and communicate the coalesced communications, e.g., in parallel. In this way the integration module 124 may be used to efficiency manage power consumption of the network interface device 112. Other scheduling may also be performed by the scheduling module 304, including scheduling when inbound communications are to be provided to one or more of the applications 118, 120 from the network interface device 112.

Example Procedures

The following discussion describes network communication and cost awareness techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems 200, 300 of FIGS. 2 and 3, respectively.

Figure 4:
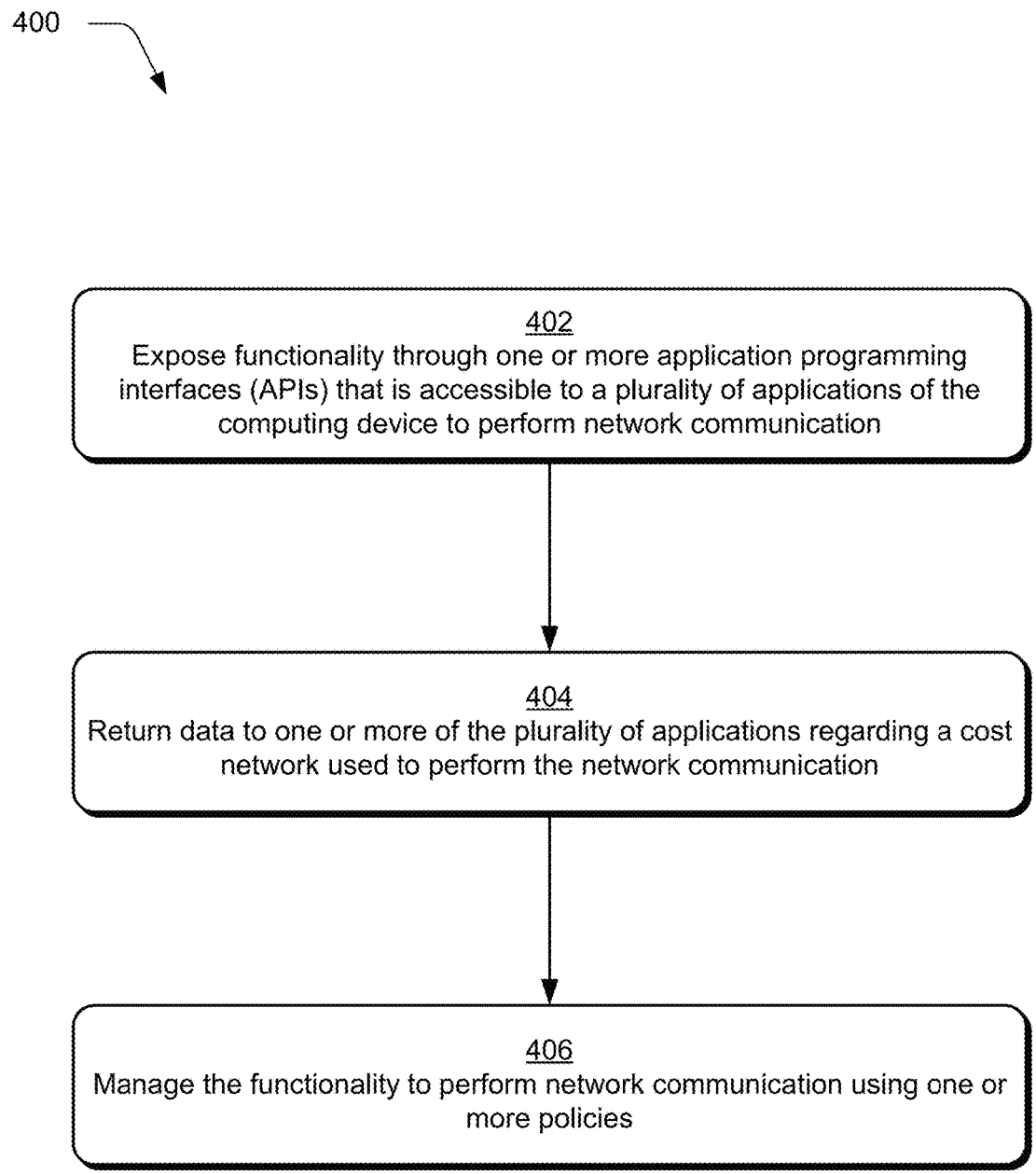
FIG. 4 is a flow diagram depicting a procedure in an example implementation in which functionality is exposed to a plurality of applications to perform network communication.

FIG. 4 depicts a procedure 400 in an example implementation in which functionality is exposed to a plurality of applications to perform network communication. Functionality is exposed through one or more application programming interfaces (APIs) that is accessible to a plurality of applications of the computing device to perform network communication (block 402). The network manager module, 122, for instance, may expose functionality through one or more APIs to applications 118, 120 to communicate via a network 114. This may include a variety of functionality as previously described in relation to FIGS. 1-3.

Data is returned to one or more of the plurality of applications regarding a cost network used to perform the network communication (block 404). The report module 208, for instance, may return data regarding bandwidth usage, which applications 118, 120 use an allocation and how much is used, a notification that a cost threshold is to be exceeded, and so on. This data may be returned to the applications 118, 120, output in a user interface for viewing by a user, and so on.

The functionality to perform network communication is managed using one or more policies (block 406). As previously described, policies may be utilized to describe and address a variety of scenarios. For example, the policy may be configured to manage the functionality based on one or more power consumption considerations, manage a rate of a download, manage a download based on availability of particular networks, coalesce downloads for the plurality of applications, cause a plurality of downloads to be performed in parallel for the plurality of applications, and so on.

Example System and Device

Figure 5:
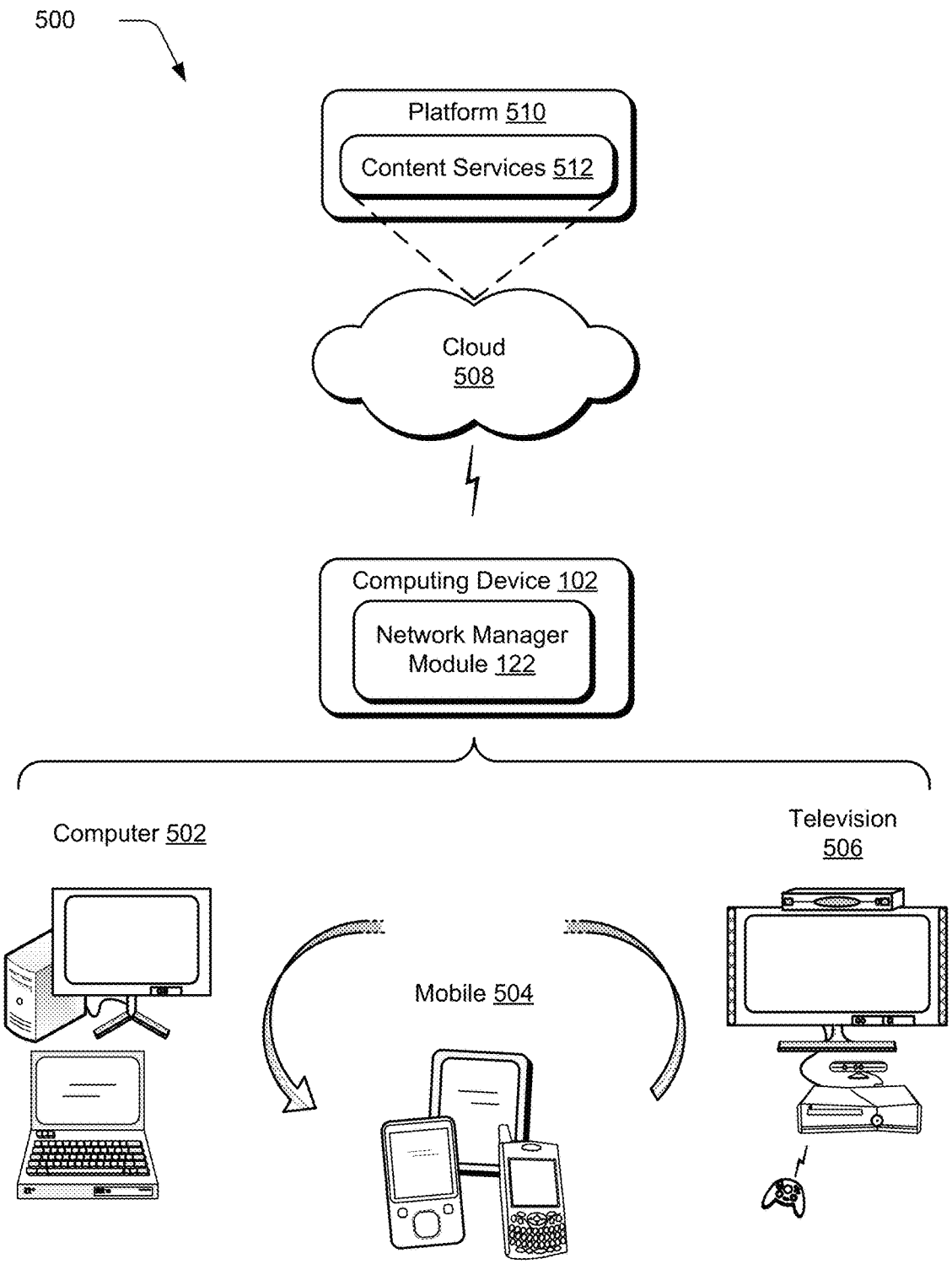
FIG. 5 illustrates an example system that includes the computing device as described with reference to FIG. 1.

FIG. 5 illustrates an example system 500 that includes the computing device 102 as described with reference to FIG. 1. The example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 502, mobile 504, and television 506 uses. Each of these configurations includes devices that may have generally different constructs and capabilities, and thus the computing device 102 may be configured according to one or more of the different device classes. For instance, the computing device 102 may be implemented as the computer 502 class of a device that includes a personal computer, desktop computer, a multi-screen computer, laptop computer, netbook, and so on.

The computing device 102 may also be implemented as the mobile 504 class of device that includes mobile devices, such as a mobile phone, portable music player, portable gaming device, a tablet computer, a multi-screen computer, and so on. The computing device 102 may also be implemented as the television 506 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein. This is illustrated through inclusion of the network manager module 122 on the computing device 102, although it should be noted that the function of this may be distributed throughout the environment, such as "over the cloud."

The cloud 508 includes and/or is representative of a platform 510 for content services 512. The platform 510 abstracts underlying functionality of hardware (e.g., servers) and software resources of the cloud 508. The content services 512 may include applications and/or data that can be utilized while computer processing is executed on servers that are remote from the computing device 102. Content services 512 can be provided as a service over the Internet and/or through a subscriber network, such as a cellular or Wi-Fi network.

The platform 510 may abstract resources and functions to connect the computing device 102 with other computing devices. The platform 510 may also serve to abstract scaling of resources to provide a corresponding level of scale to encountered demand for the content services 512 that are implemented via the platform 510. Accordingly, in an interconnected device embodiment, implementation of functionality of the functionality described herein may be distributed throughout the system 500. For example, the functionality may be implemented in part on the computing device 102 as well as via the platform 510 that abstracts the functionality of the cloud 508.

Figure 6:
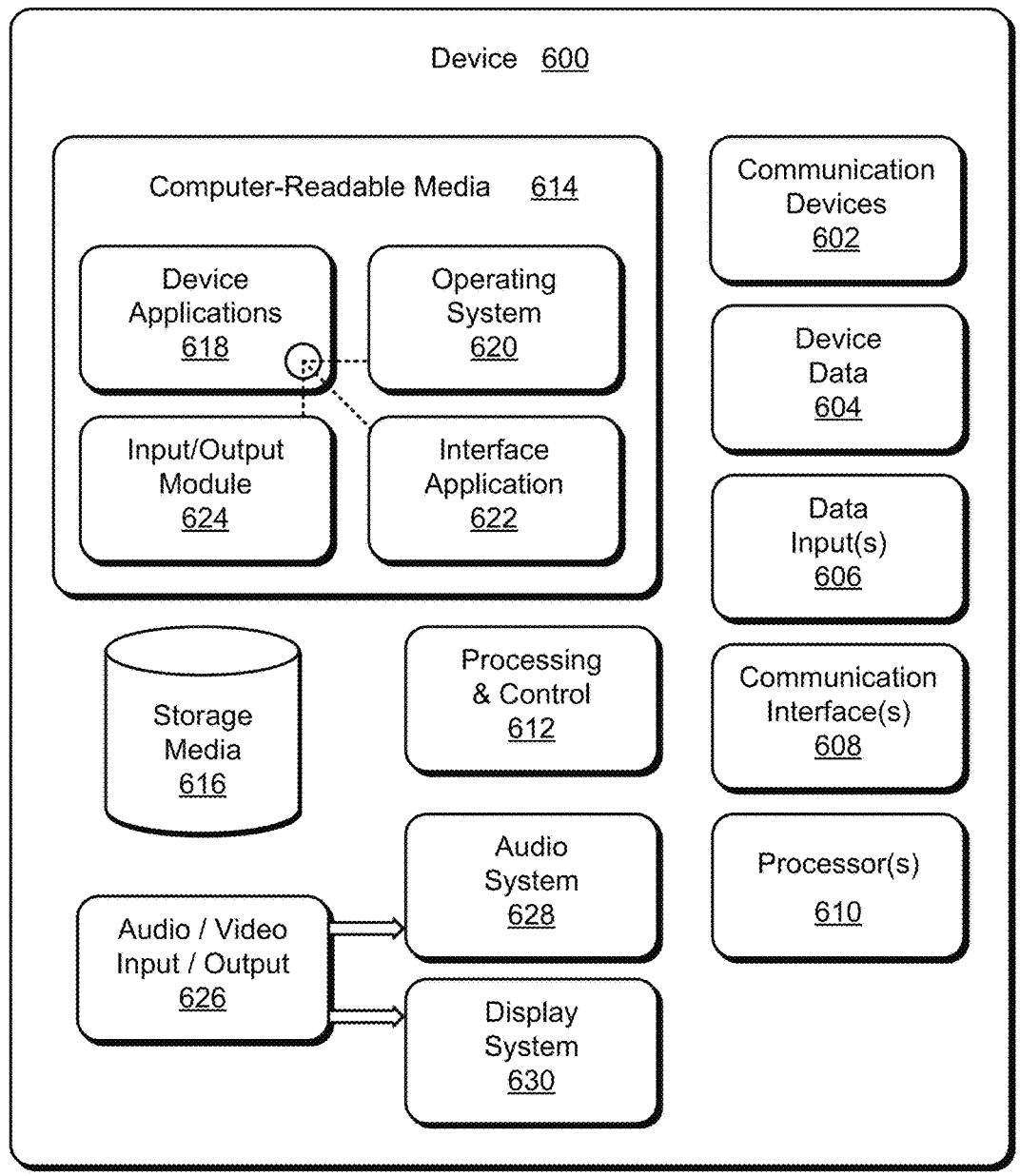
FIG. 6 illustrates various components of an example device that can be implemented as any type of computing device as described with reference to FIGS. 1-3 and 5 implement embodiments of the techniques described herein.

FIG. 6 illustrates various components of an example device 600 that can be implemented as any type of computing device as described with reference to FIGS. 1, 2, and 5 to implement embodiments of the techniques described herein. Device 600 includes communication devices 602 that enable wired and/or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on device 600 can include any type of audio, video, and/or image data. Device 600 includes one or more data inputs 606 via which any type of data, media content, and/or inputs can be received, such as user-selectable inputs, messages, music, television media content, recorded video content, and any other type of audio, video, and/or image data received from any content and/or data source.

Device 600 also includes communication interfaces 608 that can be implemented as any one or more of a serial and/or parallel interface, a wireless interface, any type of network interface, a modem, and as any other type of communication interface. The communication interfaces 608 provide a connection and/or communication links between device 600 and a communication network by which other electronic, computing, and communication devices communicate data with device 600.

Device 600 includes one or more processors 610 (e.g., any of microprocessors, controllers, and the like) which process various computer-executable instructions to control the operation of device 600 and to implement embodiments of the techniques described herein. Alternatively or in addition, device 600 can be implemented with any one or combination of hardware, firmware, or fixed logic circuitry that is implemented in connection with processing and control circuits which are generally identified at 612. Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 600 also includes computer-readable media 614, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 600 can also include a mass storage media device 616.

Computer-readable media 614 provides data storage mechanisms to store the device data 604, as well as various device applications 618 and any other types of information and/or data related to operational aspects of device 600. For example, an operating system 620 can be maintained as a computer application with the computer-readable media 614 and executed on processors 610. The device applications 618 can include a device manager (e.g., a control application, software application, signal processing and control module, code that is native to a particular device, a hardware abstraction layer for a particular device, etc.). The device applications 618 also include any system components or modules to implement embodiments of the techniques described herein. In this example, the device applications 618 include an interface application 622 and an input/output module 624 that are shown as software modules and/or computer applications. The input/output module 624 is representative of software that is used to provide an interface with a device configured to capture inputs, such as a touchscreen, track pad, camera, microphone, and so on. Alternatively or in addition, the interface application 622 and the input/output module 624 can be implemented as hardware, software, firmware, or any combination thereof. Additionally, the input/output module 624 may be configured to support multiple input devices, such as separate devices to capture visual and audio inputs, respectively.

Device 600 also includes an audio and/or video input-output system 626 that provides audio data to an audio system 628 and/or provides video data to a display system 630. The audio system 628 and/or the display system 630 can include any devices that process, display, and/or otherwise render audio, video, and image data. Video signals and audio signals can be communicated from device 600 to an audio device and/or to a display device via an RF (radio frequency) link, S-video link, composite video link, component video link, DVI (digital video interface), analog audio connection, or other similar communication link. In an embodiment, the audio system 628 and/or the display system 630 are implemented as external components to device 600. Alternatively, the audio system 628 and/or the display system 630 are implemented as integrated components of example device 600.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method of offloading network communications, the method comprising:
   sending, by an application executing on a computing device, a request to offload network communications from the application;
   receiving, by the application, cost information associated with use of a network for performing the network communications; and
   suspending the application for at least a portion of a time period during which the network communications are being performed on behalf of the application.

2. The method of claim 1, wherein the cost information includes a cost threshold associated with the network.

3. The method of claim 1, wherein the cost information relates to use of the network for the requested network communications.

4. The method of claim 1, wherein the network communications are performed with a same security context as for the application.

5. The method of claim 1, wherein the method further comprises:
   returning information regarding a status of the network communications.

6. The method of claim 1, wherein a request for authorization to exceed a cost threshold by the network communications is output if a cost threshold is reached.

7. The method of claim 1, wherein the network communications for the application are automatically paused if a cost threshold is reached.

8. A computing device for network communications, the computing device comprising:
   a memory and a processor that are respectively configured to store and execute instructions for causing the computing device to perform operations, the operations including:
   receiving, by an operating system of the computing device from an application on the computing device, a request to offload a network action from the application to the operating system;
   returning, by the operating system to the application, information associated with use of a network; and
   performing, by the operating system via the network, the requested network action on behalf of the application while the application is suspended.

9. The computing device of claim 8, wherein the information includes a threshold that corresponds to the network.

10. The computing device of claim 8, wherein the information relates to use of the network for performing the network action.

11. The computing device of claim 8, wherein performing the network action includes performing the network action in a same security context as used for the application.

12. The computing device of claim 8, wherein the operations further comprise:
    returning, by the operating system to the application, information regarding a status of the network action.

13. The computing device of claim 8, wherein the operations further comprise:
    outputting a request for authorization to exceed a threshold for the network.

14. The computing device of claim 8, wherein the operations further comprise:
    automatically pausing the network activity in response to an indication that a threshold for the network has been exceeded.

15. A computing device for network communications, the computing device comprising:

a memory and a processor that are respectively configured to store and execute instructions for causing the computing device to:
receive, from an application, a request to offload a network action to a lower-level service of the computing device;
return information associated with use of a network; and
perform, via the network, the requested network action on behalf of the application while the application is suspended.

16. The computing device of claim 15, wherein the returned information includes a threshold for the network.

17. The computing device of claim 15, wherein the network action is performed in a same security context as used for the application.

18. The computing device of claim 15, wherein the operations further comprise:
returning, by the lower-level service to the application, information regarding a status of the network action.

19. The computing device of claim 15, wherein the operations further comprise:
outputting a request for authorization to exceed a threshold for a network.

20. The computing device of claim 15, wherein the operations further comprise:
automatically pausing the network action in response to an indication that a threshold for the network has been exceeded.

* * * * *